United States Patent [19]

Lee, Jr. et al.

[11] Patent Number: 4,684,681
[45] Date of Patent: Aug. 4, 1987

[54] FLOW ENHANCED POLYPHENYLENE ETHER RESIN COMPOSITIONS

[75] Inventors: Gim F. Lee, Jr., Albany, N.Y.; Walter K. Olander, Mt. Vernon, Ind.

[73] Assignee: General Electric Company, Selkirk, N.Y.

[21] Appl. No.: 702,464

[22] Filed: Feb. 19, 1985

Related U.S. Application Data

[63] Continuation of Ser. No. 337,424, Jan. 6, 1982, abandoned.

[51] Int. Cl.$^4$ .............................................. C08K 5/52
[52] U.S. Cl. ................................. 524/127; 524/145; 524/332; 524/333; 524/392; 524/324; 524/508
[58] Field of Search ............... 524/332, 333, 508, 392, 524/145, 127, 324

[56] References Cited

U.S. PATENT DOCUMENTS

| | | | |
|---|---|---|---|
| 3,383,435 | 5/1968 | Cizek. | |
| 3,668,258 | 6/1972 | Hageman | 524/333 |
| 3,761,541 | 9/1973 | Katchman et al. | 524/508 |
| 3,887,646 | 6/1975 | Yonemitsu et al. | 524/508 |
| 3,974,235 | 8/1976 | Cooper et al. | |
| 4,101,504 | 7/1978 | Cooper et al. | |
| 4,101,505 | 7/1978 | Cooper et al. | |
| 4,172,929 | 10/1979 | Cooper et al. | |
| 4,355,126 | 10/1982 | Haaf et al. | 524/123 |

FOREIGN PATENT DOCUMENTS

| | | | |
|---|---|---|---|
| 3105946 | 8/1982 | Fed. Rep. of Germany | 524/508 |
| 46-42030 | 12/1971 | Japan. | |
| 57-105452 | 6/1982 | Japan | 524/508 |
| 57-168938 | 10/1982 | Japan | 524/508 |
| 58-84852 | 5/1983 | Japan | 524/508 |

Primary Examiner—Joseph L. Schofer
Assistant Examiner—N. Sarofim
Attorney, Agent, or Firm—Hedman, Gibson, Costigan & Hoare

[57] ABSTRACT

The melt viscosity of thermoplastic polyphenylene ether resins and compositions thereof with compatible thermoplastic resins is decreased when the melt has a small content of a diaryl sulfide wherein each aryl group adjacent to the sulfide linkage contains at least one —OH substituent (or ester thereof with a monobasic acid containing at least six carbon atoms).

9 Claims, No Drawings

FLOW ENHANCED POLYPHENYLENE ETHER RESIN COMPOSITIONS

CROSS-REFERENCE TO RELATED APPLICATION

This is a continuation of application Ser. No. 337,424, filed Jan. 6, 1982, now abandoned.

BACKGROUND OF THE INVENTION

The polyphenylene ether resins are a well-known family of linear thermoplastic engineering resins. A wide variety of these resins and a number of methods for their preparation are disclosed in Hay, U.S. Pat. Nos. 3,306,874 and 3,306,875, as well as in Stamatoff, U.S. Pat. Nos. 3,257,357 and 3,257,358.

It is a characteristic of the thermoplastic polyphenylene ether resins that they have a high viscosity in their molten state. This characteristic places a comparatively low limit on the rate at which the resins can be molded at safe temperatures in injection molding machines, and increases the power required to maintain a given rate of production from extrusion machines operating at a safe temperature. By "safe" is meant a temperature which does not cause depolymerization, oxidation or other degradation of the resin. Attempts have been made to employ organic compounds as viscosity depressants.

INTRODUCTION TO THE INVENTION

The discovery has now been made that the viscosities of the polyphenylene ether resins are decreased at their ordinary processing temperatures when the resins have a small content of one (or more than one) of the substituted diaryl sulfides which are more particularly described below. The term "sulfides" as is used herein includes disulfides.

The further discovery has been made that as little as 0.05% of the preferred substituted diaryl sulfides (based on the combined weights of the structural resins present) effects a major depression in the viscosity of the resin composition at any given melt temperature.

DESCRIPTION OF THE INVENTION

The polyphenylene oxide resins useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are homo- and copolymers of the formula:

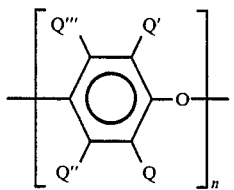

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atoms; and n represents the total number of monomer residues and is an integer of at least 50.

Especially preferred is poly(2,6-dimethyl-1,4-phenylene)ether.

The invention is further applicable to the polyphenylene ether resins in admixture with resins as defined by Cizek, U.S. Pat. No. 3,383,435, and other thermoplastic elastomers conventionally used as auxiliary or modifying resins (hereinafter termed for convenience "thermoplastic synthetic polymeric organic compounds"). These are employed to improve the impact resistance of articles molded from the mixtures; compositions of this type are disclosed in Cizek, above mentioned, as well as in Cooper et al., U.S. Pat. Nos. 3,974,235, 4,101,504; 4,101,505; and 4,172,929.

The Cizek patent, U.S. Pat. No. 3,383,435, describes thermoplastic compositions comprising a polyphenylene ether and a styrene resin.

Therein, the styrene resin is one having at least 25 percent, by weight, polymer units derived from the compound having the formula:

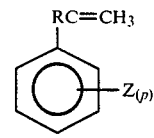

wherein R is hydrogen, lower alkyl or halogen; Z is a member selected from the class consisting of vinyl, hydrogen, chlorine and lower alkyl; and p is a whole number equal to from 0 to 5. The term "styrene resin" as used throughout this disclosure and in the claims, and defined by the above Formula II includes, by way of example, homopolymers such as polystyrene and polychlorostyrene, the modified polystyrenes such as rubber modified polystyrenes, and the styrene containing copolymers such as the styrene acrylonitrile copolymers (SAN), styrene-butadiene copolymers, styrene-acrylonitrile-α-alkyl styrene copolymers, styrene-acrylonitrile-butadiene copolymers (ABS), poly-α-methylstyrene, copolymers of ethylvinylbenzene and divinylbenzene, and the like. The preferred styrene resins are the high impact polystyrenes, the ABS copolymers and the SAN copolymers.

The Cooper et al. patent, U.S. Pat. No. 3,974,235, describes compositions of polyphenylene ether resins and an alkenyl aromatic resin which are modified with EPDM rubber.

Therein, it is stated that that the alkenyl aromatic resins are derived from monomers of the formula:

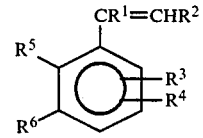

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substitute that has a tertiary carbon atom.

Specific examples of alkenyl aromatic monomers include styrene, chlorostyrene, alpha-methylstyrene, vinyl xylene, divinylbenzene and vinyl naphthalene.

The alkenyl aromatic resin that is modified with a rubbery interpolymer of a mixture of mono-olefin and a polyene may be prepared by dissolving the rubbery interpolymer in the alkenyl aromatic monomer and polymerizing the mixture in the presence of a free-radical initiator until 90–100% by weight of the alkenyl aromatic monomer has reacted to form said modified alkenyl aromatic resin. These materials are commercially available, such as the product Taflite 925-01 which is a suspension-polymerized EPDM modified, high-impact polystyrene that contains about 12% of benzene insoluble rubber and the average rubber particle size is about 8–10 microns. The EPDM component appears to be an ethylene-propylene-ethylidene norbornene terpolymer. The preferred modified alkenyl aromatic resins are those made with an EPDM rubbery interpolymer of ethylene, propylene and 5-ethylidene-2-norbornene and styrene. Preferred modified alkenyl aromatic resins will include from about 5 to about 20% by weight of rubbery interpolymer.

The Cooper et al. patent, U.S. Pat. No. 4,172,929, describes compositions which include a polyphenylene ether resin, a small-particle EPDM rubber-modified alkenyl aromatic resin and a hydrogenated A-B-A block polymer.

Therein, it is stated that the alkenyl aromatic resin should have at least 25% of its units derived from an alkenyl aromatic monomer of the formula

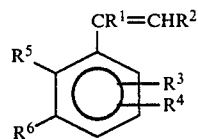
II wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene.

The alkenyl aromatic monomer may be copolymerized with materials such as those having the general formula:

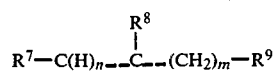
III

Wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms; alkenyl of from 1 to 12 carbon atoms, alkylcarboxylic acid of from 1 to 12 carbon atoms; alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkneyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene acrylonitrile butadiene copolymers, poly-α-methylstyrene, copolymer of ethylvinylbenzene, divinylbenzene, and styrene maleic anhydride copolymers, and block copolymers of styrene butadiene and styrene-butadiene-styrene.

The useful EPDM rubbers include those prepared from ethylene, an alpha-olefin, and a polyene. Preferred types comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and non-conjugated cyclic or open-chain dienes having 5–10 carbon atoms.

Useful EPDM rubbers also include the ethylene-propylene-ethylidene norbornene terpolymer. Preferred EPDM rubber interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubber interpolymer.

The alkenyl aromatic resin modified with a small-particle EPDM rubber may be prepared by dissolving the rubbery interpolymer in the alkenyl aromatic monomer and polymerizing the mixture, preferably in the presence of a free-radical initiator, until 90–100% by weight of the alkenyl aromatic monomer has reacted to form said small-particle EPDM-modified alkenyl aromatic resin.

In the selectively hydrogenated elastomeric block copolymers of the A-B-A type, the terminal blocks A represent polymerized monomers of Formula II above. Center block B represents a polymerized conjugated diene of at least four carbon atoms, preferably selected from the group of 1,3-butadiene, 2-methyl-1,3-butadiene, 2,3-dimethyl-1,3-butadiene, and 1,3-pentadiene. The preferred A-B-A block copolymers are the styrene-butadiene-styrene block copolymers having 60 to 90 parts by weight of styrene to 100 parts by weight of butadiene.

The elastomeric A-B-A block copolymers useful in this invention are selectively hydrogenated in that only the center block B is hydrogenated. For example, in such styrene-butadiene-styrene block copolymers only the center block, butadiene, and not the terminal blocks, styrene, have been hydrogenated.

The ratios of the polymerized monomers can vary broadly, so long as the molecular weight of the center block is greater than the combined molecular weights of terminal blocks. Preferably, within this limitation, the molecular weight of each hydrogenated terminal block will range from about 4,000 to about 115,000 and that of the center block will range from about 20,000 to about 450,000.

Unhydrogenated block copolymers can be prepared by an organometallic initiation process using, for example, sodium or lithium metal or an organic derivatives thereof. The diene monomers can be polymerized with a monofunctional or difunctional initiator.

Selective hydrogenation may be conducted using a variety of hydrogenation catalysts, e.g., nickel, Raney nickel, copper chromate, molybdenum sulfide, finely divided platinum, etc., on a carrier. The hydrogenation can be carried out at any desired temperature or pressure, from atmospheric to about 3,000 p.s.i.g., the usual range being between about 100 and 1,000 p.s.i.g., at temperatures of from about 75° to 600° F., for a period of time ranging from about 0.1 to 24 hours, preferably about 0.2 to 8 hours.

Preferably the average unsaturation of center block B is the A-B-A type block copolymers is reduced to less than about 20% of its original value.

In addition, the molding compositions of the present invention can and advantageously do contain one or more of the supplementary non-resinous agents which have heretofore been customarily present in polyphenylene ether resin molding compositions to improve certain other physical and chemical properties of the moldings. The agents include flame retardants, plasticizers, antioxidants, strengthening fibers (for example glass fibers and graphite whiskers), minral fillers, abrasion resistant components, dyes, and pigments. Many of such agents are disclosed in said U.S. Pat. No. 4,172,929 to Cooper et al.

In general, the polyphenylene ether resin is present in the molding composition to the extent of at least 10%, by weight, this being about the smallest proportion which provides the benefits of the present invention. This resin can be the only component present.

The auxiliary thermoplastic resins are generally present in an amount between about 10% and 90% of the weight of the composition, the range of 30% to 70% being preferred so as to provide molded products which possess to a substantial extent the beneficial properties both of the polyphenylene ether resin component and of the auxiliary resin component.

The supplementary non-resinous agents are present in total amount between about 1% and 50%, so as to provide the benefits which these materials have conferred in the past on shaped molded articles made from thermoplastic resins.

The present invention does not depend upon the specific auxiliary or modifying resins which may be present in the composition, or on the specific non-resinous supplementary agents which also may be present, or on the respective proportions thereof, except that the total weight of said auxiliary or modifying resins and said non-resinous supplementary components should not exceed 90% of the total weight of the molding composition.

The present invention thus provides an engineering grade thermoplastic molding composition containing more than 10% by weight of a thermoplastic polyphenylene ether resin and a small but effective amount (preferably between 0.1% and 5% of the total weight of thermoplastic components therein) as latent flow promoter for said resin, of a substituted diaryl sulfide, each sulfide-adjacent aryl group of which carries at least one substituent selected from the group consisting of —OH and esters thereof with monobasic acids containing at least six carbon atoms.

More in detail, the flow promoters (also herein termed "viscosity depressants") which are suitable for use in the compositions of the present invention are substituted diaryl sulfides and disulfides containing the characterizing linkage:

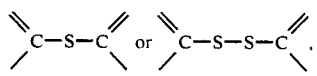

wherein the

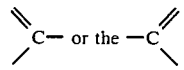

component designates the residue of an aryl unit, for example phenyl or naphthyl.

The hydroxy groups referred to are reactive and are phenolic. They can be ortho, meta or para with respect to the sulfur, but compounds wherein the hydroxyl substitutent (or one of the hydroxyl substituents) is in the ortho position appear to provide the best viscosity depressing effect per unit weight. Compounds wherein the hydroxyl groups have been blocked by adjacent non-reactive groups have provided very satisfactory results.

One (or more than one) of the aforesaid hydroxyl groups can be present in esterified form. Acids which are suitable for this purpose are monobasic and preferably contain at least six carbon atoms, more preferably as aryl substituents. Suitable monobasic acids for this purpose are diphenyl phosphate (($C_6H_5O)_2P(O)OH$); 2-naphthyl phenyl phosphate; dihexyl phosphte; di-2,6-xylyl phosphate; ditolyl phosphate; phenyl sulfate ($C_6H_5OS(O_2)OH$); and 2-naphthyl sulfate. Preferably these acids are used in the form of their phenyl esters, so as to permit esterification to proceed by way of ordinary transesterification reaction with evolution of phenol.

Substituted diaryl sulfides which are suitable for use as viscosity depressants in the present invention include the following:

| No. | Compound | Formula |
|---|---|---|
| 1. | 4,4'-Thiodiphenol | HO–C₆H₄–S–C₆H₄–OH |
| 2. | 4,4'-Dithiodiphenol | HO–C₆H₄–S–S–C₆H₄–OH |
| 3. | Ester of 4,4'-dithiodiphenol with diphenyl phosphate (1:1 molar ratio) | HO–C₆H₄–S–S–C₆H₄–O–P(=O)(O–C₆H₅)₂ |
| 4. | Ester of 4,4'-dithiodiphenol with diphenyl phosphate (1:2 molar ratio) | (C₆H₅O)₂P(=O)–O–C₆H₄–S–S–C₆H₄–O–P(=O)(OC₆H₅)₂ |
| 5. | 2,2'-Thiobis-(4-methyl-6-t-butylphenol) | [4-CH₃, 6-(CH₃)₃C, 2-OH-C₆H₂]–S–[same] |
| 6. | 1,1'-Thiobis-2,2'-naphthol | (2-HO-naphthyl)–S–(2-HO-naphthyl) |
| 7. | 4,4'-Thiodi-2,2',6,6'-xylenol | HO–[2,6-(CH₃)₂-C₆H₂]–S–[2,6-(CH₃)₂-C₆H₂]–OH |
| 8. | Ester of 4,4'-thiodi-2,2',6,6-xylenol with phenyl sulfate (1:1 molar ratio) | HO–[2,6-(CH₃)₂-C₆H₂]–S–[2,6-(CH₃)₂-C₆H₂]–O–S(=O)₂–O–C₆H₅ |

The respective sulfides and disulfides are closely similar in their viscosity depressant powers, and in most other respects they are nearly equivalents. However, the sulfides are more readily available, and for this reason they are preferred.

Of these compounds, No. 5 appears to be the most effective as viscosity depressant, followed by No. 6 and then by No. 1.

The molding compositions of the present invention can be prepared by admixing the components together, or by admixing them separately, to form a free-flowing composition which is of suitable particle size for use as direct feed to molding machines.

However, it will often be more advantageous to form the components (including the substituted diaryl sulfide) into a homogeneous melt, preferably under a blanket of inert gas, and then to form solid particles of desired size from the melt, either by the extrusion, cooling and chopping method, or by solidifying the melt in any convenient way and grinding the resulting product to desired particle size. By both methods separation of one or more of the components during shipment is prevented.

The invention is further illustrated by the examples which follow. These examples are best embodiments of the invention, and the invention is not to be construed as limited thereto. Parts are by weight unless otherwise stated.

EXAMPLE 1

100 parts of a coarsely-ground commercial poly(2,6-dimethyl-1,4-phenylene ether) resin (PPO, General Electric Co.) are melted under a blanket of nitrogen and to the melt is added with stirring 2% based on its weight of 4,4'-thiodiphenol. The viscosity of the melt noticeably decreases.

EXAMPLE 2

The foregoing procedure is repeated with a melt composed of 50 parts of the polyphenylene ether resin and 50 parts of a rubber-modified high impact polystyrene (A6H6 of Amoco Oil Co.). A similar decrease in viscosity is noted.

EXAMPLE 3

The following illustrates the effectiveness of a dithio bisphenol and a complex ester of such a phenol in decreasing the viscosity of an engineering-grade thermoplastic molding composition in molten state, and the effect of these compounds on the tensile properties of articles molded from the compositions.

A base molding composition is prepared by heating a mixture of the polyphenylene ether resin of Example 1 and the modified polystyrene of Example 2 to 540° F. Samples are taken to which are added the viscosity-reducing agents noted below, and control samples are reserved. The flow channel values of the melts are determined, and test bars are molded from the melts and their principal tensiles values are determined. The procedure is repeated with a different ratio of resin components. Results are as follows:

EXAMPLE 4

The following illustrates the effect of a naphthol sulfide as viscosity depressant in a composition according to the present invention.

A blend of 45 parts of the polyphenylene ether of Example 1 and 55 parts of a rubber modified polystyrene is heated to 525° F. A portion is removed and to it is added with stirring 0.5% by weight based on the combined weights of the resins of 1,1'-thiobis-2-naphthol and the remainer is processed as control. The viscosity of both portions is determined by the flow channel method. Results are as follows:

| % Viscosity Depressant Added | Flow Channel Length, Inches |
|---|---|
| None (control) | 16.0 |
| 0.5 | 29.25 |

EXAMPLE 5

The following illustrates the effect of a hindered phenolic sulfide as viscosity depressant for a composition comprised largely of a polyphenyl ether resin containing a standard thermal degradation inhibitor component. The following components are mixed:

| | |
|---|---|
| Poly(2,6-dimethyl-1,4-phenylene) ether resin of Example 1 | 91 parts |
| Styrene-butadiene-styrene block copolymer hydrogenated midblock (KG-1651) | 8 |
| Triphenyl phosphate (plasticizer) | 9 |
| Zinc sulfide | 0.15 |
| thermal degradation inhibitors | |
| Zinc oxide | 0.15 |

Dry blends are made up separately and extruded back to back. One portion is a control. Two other portions contain 2,2'-thiobis-(4-methyl-6-t-butyphenol, "CAO-6" of Ashland Chemical Co.). The melt flow characteristics of the resulting compositions at 525° F. are determined by the flow channel length. Results are as follows:

| % Viscosity Depressant Added | Flow Channel Length, Inches |
|---|---|
| None (control) | 15.5 |
| 0.5 | 19.0 |
| 1.0 | 20.75 |

| Run No. | Resin Parts[1] PPO | Resin Parts[1] A6H6 | Viscosity Depressant[1] Design. | Viscosity Depressant[1] % | Melt Viscosity[2] Poises | Melt Viscosity[2] Flow Chan. | Tensile Elong. % | Tensile Izod | Tensile Impact[3] Gardner |
|---|---|---|---|---|---|---|---|---|---|
| 1 | 45 | 55 | Control | — | — | 17 | 48 | 2.8 | 130 |
| 2 | 45 | 55 | DTDP[4] | 1.10 | — | 26.2 | 46 | 1.6 | 50 |
| 3 | 40 | 60 | Control | — | 1,750 | 14 | 46 | 3.4 | 140 |
| 4 | 40 | 60 | DTDP[4] | 0.5 | 1,300 | 17.5 | 43 | 2.4 | 60 |
| 5 | 40 | 60 | Control | — | 1,550 | 13.5 | — | 3.4 | 130 |
| 6 | 40 | 60 | Ester[5] | 0.5 | 1,280 | 15.5 | — | 2.9 | 130 |

[1]See text above
[2]Poises at 540° F., 1500 sec.$^{-1}$; flow channel = length in inches.
[3]Izod = ft. lb./in.n; Gardner = in.-lb.
[4]DTDP = 4,4'-dithiodiphenol.
[5]Ester = Ester of 4,4'-dithiodiphenol with diphenyl phosphate 1:2 molar ratio.

EXAMPLE 6

The procedure of Example 4 is repeated except that the proportion of the poly(2,6-dimethyl-1,4-phenylene)ether resin is decreased, and a change is made in the plasticizer component. A mix is made of the following components:

| | |
|---|---|
| Poly(2,6-dimethyl-1,4-phenylene)ether resin of Example 1 | 45 Parts |
| Polystyrene modified with polybutadiene rubber (FG-834 of Foster-Grant Co.) | 55 |
| Polyethylene | 1.5 |
| DPDP | 1.0 |
| Zinc sulfide thermal degradation in inhibitors | 0.15 |
| Zinc oxide | 0.15 |

The mix is tested as a molding composition by the method of Example 5. Results are as follows:

| % Viscosity Depressant Added | Flow Channel Length, inches |
|---|---|
| None (control) | 17.25 |
| 0.5 | 30.0 |

The above mentioned patents and/or publications are incorporated herein by reference. Obviously, other modifications and variations of the present invention are possible, in the light of the above teachings. For instance, instead of poly(2,6-dimethyl-1,4-phenylene)ether, copolymers such as poly(2,6-dimethyl-co-2,3,6-trimethyl-1,4-phenylene)ether can be used. The compositions can also contain other ingredients such as flame-retardants, drip retardants, plasticizers, anti-oxidants, fillers and/or reinforcements, pigments, coloring agents, in conventional amounts. It is, therefore, to be understood that changes may be made in the particular embodiments of the invention described which are within the full intended scope of the invention as defined by the appended claims.

We claim:

1. A thermoplastic molding composition containing more than 10% by weight of a structural thermoplastic polyphenylene ether resin, a rubber modified high impact polystyrene, a selectively hydrogenated styrene-butadiene-styrene block copolymer and a small but effective amount of a latent flow promoter consisting essentially of 4,4'-thiodiphenol.

2. A composition according to claim 1 wherein the polyphenylene ether resin is a poly-(2,6-dimethyl-1,4-phenylene)ether resin.

3. A composition according to claim 1 containing about 10% to 90% by weight of said rubber modified high impact polystyrene.

4. A composition according to claim 3 wherein the rubber modified high impact polystyrene is a polybutadiene modified polystyrene resin.

5. A composition according to claim 3 wherein the synthetic polymeric substance is a styrene-butadiene-styrene block copolymer or a selectively hydrogenated modification thereof.

6. A composition according to claim 1 wherein the weight of said flow promoter is between 0.1% and 5% of the total weight of thermoplastic components therein.

7. A composition according to claim 1 containing 1% to 50%, based on the weight of the thermoplastic components therein, of a triaryl plasticizer for said polyphenylene ether resin.

8. A composition according to claim 7 wherein the triaryl phosphate is triphenyl phosphate.

9. A composition according to claim 1 comprising at least one component selected from the group consisting of mineral fillers, fire-retardants, strengthening fibers, dyes, and pigments.

* * * * *